US009434372B2

(12) United States Patent
Iwasa (10) Patent No.: US 9,434,372 B2
(45) Date of Patent: Sep. 6, 2016

(54) STARTING CONTROL APPARATUS FOR HYBRID VEHICLE

(71) Applicant: NISSAN MOTOR CO., LTD., Yokohama-shi, Kanagawa (JP)

(72) Inventor: Hiroki Iwasa, Atsugi (JP)

(73) Assignee: NISSAN MOTOR CO., LTD., Yokohama-shi, Kanagawa (JP)

(*) Notice: Subject to any disclaimer, the term of this patent is extended or adjusted under 35 U.S.C. 154(b) by 0 days.

(21) Appl. No.: 14/432,497

(22) PCT Filed: Oct. 3, 2013

(86) PCT No.: PCT/JP2013/076915
§ 371 (c)(1),
(2) Date: Mar. 31, 2015

(87) PCT Pub. No.: WO2014/054724
PCT Pub. Date: Apr. 10, 2014

(65) Prior Publication Data
US 2015/0239452 A1  Aug. 27, 2015

(30) Foreign Application Priority Data
Oct. 4, 2012  (JP) ................................ 2012-221966

(51) Int. Cl.
*B60W 10/00* (2006.01)
*B60W 10/06* (2006.01)
(Continued)

(52) U.S. Cl.
CPC ............... *B60W 10/06* (2013.01); *B60K 6/48* (2013.01); *B60K 6/485* (2013.01); *B60K 6/543* (2013.01); *B60W 10/02* (2013.01); *B60W 10/08* (2013.01);
(Continued)

(58) Field of Classification Search
CPC combination set(s) only.
See application file for complete search history.

(56) References Cited

U.S. PATENT DOCUMENTS 5,819,192 A * 10/1998 Wakahara .......... B60K 23/0808
180/247
6,157,885 A * 12/2000 Sakaguchi ............ B60W 10/06
477/46

(Continued)

FOREIGN PATENT DOCUMENTS

JP   2007-261442 A   10/2007
JP   2008-105494 A    5/2008
(Continued)

OTHER PUBLICATIONS

Extended European Search Report issued Jan. 18, 2016 in European Patent Application No. 13843632.4.

*Primary Examiner* — Jonathan L Sample
(74) *Attorney, Agent, or Firm* — Drinker Biddle & Reath LLP (57) ABSTRACT

A starting control apparatus for a hybrid vehicle capable of stabilizing and controlling the amount of torque transmitted by the clutch during engine start up. The hybrid vehicle includes a first clutch disposed between an engine and a motor/generator, and an engaging pressure is supplied to the first clutch from a line pressure regulating valve to a line pressure circuit into which a mechanical oil pump delivers operating fluid. A starting control section that performs the starting control in which the clutch is engaged, torque is input to the engine, and the engine is started in response to an engine start request while traveling in EV mode, is provided with a start determining section that executes starting control when the transmission input torque input to a belt-type continuously variable transmission exceeds a preset input torque based on the operating fluid pressure.

7 Claims, 7 Drawing Sheets

(51) Int. Cl.

| | | |
|---|---|---|
| *B60K 6/48* | (2007.10) | |
| *B60K 6/543* | (2007.10) | |
| *B60W 10/02* | (2006.01) | |
| *B60W 10/08* | (2006.01) | |
| *B60W 20/00* | (2016.01) | |
| *B60W 10/30* | (2006.01) | |
| *B60K 6/485* | (2007.10) | |
| *F16H 61/00* | (2006.01) | |
| *F16H 59/14* | (2006.01) | |

(52) U.S. Cl.
 CPC ............ B60W 10/30 (2013.01); B60W 20/00 (2013.01); B60W 20/40 (2013.01); F16H 61/0021 (2013.01); *B60K 2006/4816* (2013.01); *B60W 2510/1025* (2013.01); *F16H 2059/147* (2013.01); *Y02T 10/6221* (2013.01); *Y02T 10/6286* (2013.01)

(56) References Cited

U.S. PATENT DOCUMENTS

| | | | | |
|---|---|---|---|---|
| 6,282,492 B1* | 8/2001 | Gorai | ............... | G01C 21/34 701/25 |
| 6,537,169 B1* | 3/2003 | Morii | ............... | F16H 3/721 475/10 |
| 6,537,189 B1* | 3/2003 | Gehle | ............... | B31B 1/25 493/396 |
| 6,655,485 B1* | 12/2003 | Ito | ............... | B60W 20/40 180/65.6 |
| 6,896,090 B2* | 5/2005 | Kanda | ............... | B62D 5/008 180/402 |
| 7,108,630 B2* | 9/2006 | Ozeki | ............... | B60K 6/48 477/3 |
| 7,252,619 B2* | 8/2007 | Tabata | ............... | B60K 6/365 477/3 |
| 7,291,080 B2* | 11/2007 | Minagawa | ............... | B60K 6/365 475/5 |
| 2003/0181276 A1* | 9/2003 | Minagawa | ............... | B60K 6/445 475/5 |
| 2005/0079942 A1* | 4/2005 | Bauknecht | ............... | B60K 6/365 475/5 |
| 2006/0048516 A1* | 3/2006 | Tenbrock | ............... | B60K 6/48 60/698 |
| 2006/0272869 A1* | 12/2006 | Hidaka | ............... | B60K 6/48 180/65.25 |
| 2007/0227791 A1* | 10/2007 | Ueno | ............... | B60K 6/387 180/65.245 |
| 2008/0312022 A1* | 12/2008 | Martin | ............... | F16H 3/66 475/83 |
| 2009/0055073 A1* | 2/2009 | Matsubara | ............... | B60K 6/445 701/102 |
| 2009/0075774 A1* | 3/2009 | Tabata | ............... | B60K 6/445 475/150 |
| 2010/0125021 A1* | 5/2010 | Matsubara | ............... | F16H 61/061 477/5 |
| 2011/0212804 A1* | 9/2011 | Imamura | ............... | B60K 6/365 475/150 |
| 2011/0230308 A1* | 9/2011 | Inoue | ............... | F02D 41/0205 477/54 |
| 2012/0165146 A1* | 6/2012 | Samie | ............... | F16D 25/0638 475/5 |
| 2012/0247911 A1* | 10/2012 | Noda | ............... | B60L 3/0023 192/113.32 |
| 2012/0258825 A1* | 10/2012 | Kodama | ............... | F16H 61/66272 474/69 |

FOREIGN PATENT DOCUMENTS

| | | |
|---|---|---|
| JP | 2010-179860 A | 8/2010 |
| JP | 2010-201963 A | 9/2010 |
| JP | 2010-241156 A | 10/2010 |
| WO | WO-2011-092856 A1 | 8/2011 |

\* cited by examiner

STARTING CONTROL APPARATUS FOR HYBRID VEHICLE

TECHNICAL FIELD

The present invention relates to a starting control apparatus for a hybrid vehicle equipped with a mechanical pump for supplying operating hydraulic fluid pressure to an automatic transmission and a clutch in a drive train.

BACKGROUND

Conventionally, a starting control apparatus for a hybrid vehicle is known in which, in a hybrid vehicle with a clutch disposed between an engine and a motor/generator, a driving force of the motor/generator is input to an engine in the clutch engaged state to start the engine (for example, Patent Document 1).

In such a hybrid vehicle, the engagement of the clutch is generally performed by the hydraulic fluid supplied from the mechanical oil pump which in turn is driven by rotation of the motor/generator (for example, Patent Document 2).

PRIOR ART LITERATURE

Patent Documents

Patent Document 1: JP 2010-201963 A
Patent Document 2: JP 2010-241156 A

SUMMARY OF THE INVENTION

Problem to be Solved by the Invention

In the case in which the mechanical oil pump described above is in place as a fluid pressure source for use in control of the clutch control as well as control of a transmission, when increasing a control pressure in response to increase in an input torque demand to the transmission, there is a possibility of insufficient engagement pressure of the clutch, which would lead to risk that the clutch transmission torque capacity would not be controlled stably.

Also, at the time of engine start up, if the transmission torque capacity of the clutch cannot be controlled stably, there is a possibility of deterioration in the engine starting performance or generation of sound and vibration.

The present invention has been made by paying attention to the problem. An object of the present invention is to provide, when the engine is started, a starting control apparatus for a hybrid vehicle that may stable control the transmission torque capacity of the clutch.

Mechanism for Solving the Problem

In order to achieve the object described above, the present invention is directed to a hybrid vehicle in which a first clutch is disposed between an engine and a motor, wherein the clutch engagement pressure is supplied from a mechanical pump via a control valve disposed in a line pressure circuit for delivering operating hydraulic fluid, the hybrid vehicle being provided with a starting control section that, in response to an engine start request by driving the motor in an EV driving mode, executes a starting control to start the engine by inputting a torque from the motor to the engine via the first clutch, and a start determination section included in the starting control section, which calculates a transmission input torque representing an input torque to an automatic transmission and execute the starting control when the transmission input torque exceeds a preset input torque previously set based on a pressure of the operating hydraulic fluid.

Effect of the Invention

In the starting control apparatus for a hybrid vehicle according to the present invention, when the transmission input torque exceeds the preset input torque that is set based on the pressure of the operating hydraulic fluid, the engine starting control is executed. Therefore, it is possible to suppress the transmission input torque during the engine starting control so that the hydraulic fluid pressure in a line pressure circuit may be suppressed.

Thus, shortage in clutch engagement pressure due to increase in the pressure of the operating hydraulic fluid may be prevented. Also, it is possible to prevent the transmission torque of the first clutch from being stable so that deterioration in engine startability, generation of sound/vibrations may be suppressed.

Thus, in the present invention, even when the input torque request to the automatic transmission is increased, it is possible to provide a starting control apparatus for a hybrid vehicle, which may stably control the transmission torque capacity of the first clutch.

Below, description is give of an embodiment of the control apparatus for a hybrid vehicle according to the present invention with reference to the drawings.

FIRST EMBODIMENT

First, description is made for the configuration.

Figure 1:
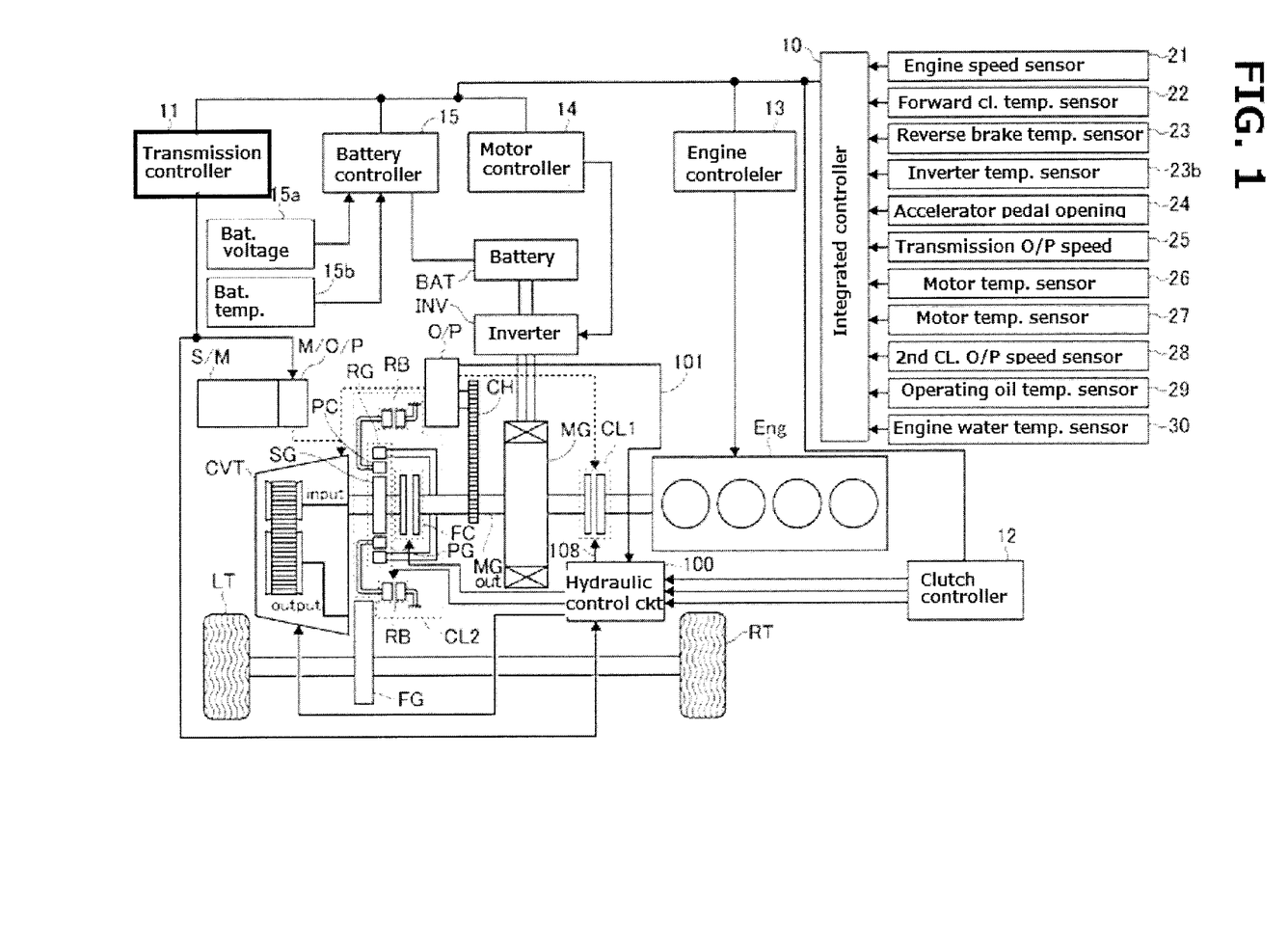
FIG. 1 is an overall system diagram showing a parallel hybrid vehicle to which a starting control apparatus for a hybrid vehicle is applied in a first embodiment.

FIG. 1 is an overall system diagram showing a parallel hybrid vehicle to which a starting control apparatus for a hybrid vehicle in the first embodiment is applied.

Below, with reference to FIG. 1, description is given of the drive system as well as the control system.

The drive system of the parallel hybrid vehicle of the first embodiment is provided with, as shown in FIG. 1, an engine Eng., a first clutch (clutch) CL1, a motor/generator (motor) MG, a second clutch CL2, a stepless transmission (belt-type continuously variable transmission) CVT, a final gear FG, left driving wheel LT, and right driving wheel RT.

The hybrid drive system of the first embodiment includes various drive modes such as an electric vehicle drive mode (hereinafter referred to as "EV mode"), a hybrid vehicle drive mode (hereinafter referred to as "HEV mode"), a quasi-electric vehicle drive mode (referred to as "semi EV mode"), and a driving torque control start mode (hereinafter, referred to as "WSC mode").

In the "EV mode", the vehicle travels with the first clutch CL1 released or disengaged and driven only by power of the motor/generator MG.

In the "HEV mode", the first clutch CL1 is in the engaged state, and the vehicle travels in one of the a motor assist driving mode, a drive with generating electricity mode, and an engine driven mode.

In the "quasi-EV mode", the first clutch CL1 is in the engaged state with the engine being turned OFF so that the vehicle travels with the power of the motor/generator MG only.

In the "WSC mode", when starting by selecting from P or N range to D range in the "HEV mode" or starting in D range from the "EV mode" or "HEV mode", by performing a rotation control of the motor/generator MG to maintain a slip engaged state of the second clutch CL2 to start the vehicle while controlling a clutch torque capacity that passes the second clutch CL2 to a required driving torque determined by the vehicle state and driver's operation. Note that the "WSC" is an abbreviation for "Wet Start Clutch".

The engine Eng. is operable under a lean burn condition and is subject to control the engine torque to match a command value according to an intake air amount adjusted by a throttle actuator, a fuel injection amount by injectors, and ignition timing by the spark plug.

The first clutch CL1 is interposed position between the engine Eng. and the motor/generator MG. As the first clutch CL1, for example, a dry clutch is used which is open at all times by the urging force of a diaphragm spring (normally open), and is controlled to engage/semi-engage/disengage the transmission between the engine ENG. and the motor/generator MG. When the first clutch CL1 is fully engaged, the sum of motor torque and the engine torque is transferred to the second clutch CL2. When disengaged, only the motor torque is transmitted to the second clutch CL2. Note the control between the semi-engagement and disengagement is done by stroke control for a hydraulic actuator.

The motor/generator MG has an AC synchronous motor structure, and performs the driving torque control and rotational speed control during starting or running. The motor/generator further operates to recover to the battery BAT of the vehicle kinetic energy by a regenerative brake control during braking or vehicle deceleration.

The second clutch CL2 is intended to transmit the torque delivered from the engine EGN. and the motor/generator MG to the left and right drive wheels LT, RT via a belt-type continuously variable transmission CVT and a final gear set FG (in a state in which the first clutch CL1 is engaged). The second clutch CL2 is provided with a single pinion type planetary gear set PG with a sun gear SG, a plurality of pinion gears (not shown), a ring gear RG, a planetary carrier PC, a forward clutch FC, and a reverse brake RB.

In addition, the ring gear RG of the planetary gear PG is connected with a motor output shaft MGout of the motor/generator MG, while the sun gear SG of the planetary gear PG is connected to a transmission input shaft of the belt-type continuously variable transmission CVT. Further, the forward clutch FC is interposed between the motor output shaft MGout. Moreover, the reverse brake RB is interposed between the planetary carrier PC and a clutch case (not shown).

In the operation of the second clutch CL2, by disengaging the forward clutch FC and the reverse brake RB at the same time, torque transmission will be disconnected (neutral state).

In addition, by engaging the forward clutch FC while releasing the reverse brake RB, the sun gear SG is directly coupled to the motor output shaft MGout. Note that, since the ring gear RG is directly connected to the motor output shaft MGout, the sun gear SG and the ring gear RG rotate at the equal rotation speed so that a transmission torque is generated and the output rotation of the motor/generator MG will be transmitted in a positive direction. In other words, the forward clutch FC functions as a friction element that transmits the output rotation of the motor/generator MG in a positive direction. Normally, at a vehicle start, the vehicle movers forward by receiving the output rotation of the motor/generator in the positive direction, i.e., without being reversed by allowing the motor/generator MG to rotate in the positive direction while engaging the forward clutch FC and releasing the reverse brake RB.

In addition, by engaging the reverse brake RB while releasing the forward clutch FC, the planetary carrier PC is fixed to the clutch case. That planet carrier PC is unable to revolve. Therefore, the rotation transmitted from the motor output shaft MGout to the ring gear RG is transmitted to the SG via the planet carrier PC that rotates yet without revolving to reversely rotate the sung gear SB. As a result, the transmission torque is generated, and the output rotation of the motor/generator MG is transmitted in the opposite direction. In other words, the reverse brake RB acts as a friction element for transmitting the output rotation of the motor/generator MG in the opposite direction. Typically, when the vehicle moves backward, by rotating the motor/generator MG in the positive direction, engaging the reverse brake RB, and releasing the forward clutch FC, the output rotation of the motor/generator MG in the positive direction transmitted with its direction inverted to allow the vehicle to travel backward (drive in reverse).

In addition, the forward clutch FC is a wet multi-plate clutch of normally open type, while the reverse brake RB is a wet multi-plate brake of normally open type. Each component is responsive to a clutch pressing force (hydraulic pressure) to generate a transmission torque (clutch torque capacity). Further, the heat capacities of the forward clutch FC and reverse brake RB are respectively set smaller.

The belt-type continuously variable transmission CVT is structured by a pair of pulleys (primary pulley PR1 (see FIG. 7) and a secondary pulley) and a pulley belt stretched between the pair of pulleys. By changing each pulley width of the pair of pulleys to thereby changing the diameter of the associated surface sandwiching the pulley belt, a speed ratio (pulley ratio) is subject to control freely.

Furthermore, the motor output shaft MGout is connected to an input gear of the mechanical oil pump O/P through a chain CH. The mechanical oil pump O/P is a pump operated by the rotational driving force of the motor/generator MG, for example, is configured to be a gear pump, a vane pump or the like. Note that the mechanical oil pump O/P is operable to deliver or discharge operating oil regardless in the direction of rotation of the motor/generator MG. Also, as an oil pump, an electric oil pump M/O/P operated by a rotational driving force of the sub motor S/M is provided.

Further, the mechanical oil pump O/P and the electric oil pump M/O/P serve as a hydraulic source for producing a control pressure to the first and second clutches CL1, CL2 and another control pressure for the belt-type continuously variable transmission CVT. In this hydraulic source, when the delivery oil amount is sufficient from the mechanical oil pump O/P, the sub motor S/M is stopped to stop the electric oil pump M/O/P. When the delivery oil pressure decreases from the mechanical oil pump O/P, control switches to operate the sub motor S/M to drive the electric oil pump M/O/P to deliver operating oil from the electric oil pup M/O/P as well.

The control system of the parallel hybrid vehicle in the first embodiment is provided with, as shown in FIG. 1, an inverter INV, a battery BAT, an integrated controller 10, a transmission controller 11, a clutch controller 12, an engine controller 13, a motor controller 14, a battery controller 15, and a battery voltage sensor 15a, a battery temperature sensor 15b, an engine speed sensor 21, a forward clutch temperature sensor 22, a reverse brake temperature sensor 23, an accelerator pedal opening sensor 24, a transmission output rotation speed sensor 25, a motor speed sensor 26, a second clutch output rotation speed sensor 28, and an operating oil temperature sensor 29.

The inverter INV performs the DC/AC conversion to generate a drive current of the motor/generator MG. Further, by reversing the phase of the drive current to be generated, the output rotation of the motor/generator MG may be inverted.

The battery BAT accumulates the regenerative energy from the motor/generator MG through the inverter INV.

The integrated controller 10 calculates a target drive torque from a battery condition (for example, input from the battery controller 15), the accelerator opening (for example, detected by the accelerator opening sensor 24), and the vehicle speed (for example, a synchronized value with the transmission output speed, detected by the transmission output rotation speed sensor 25). In accordance with the result thereof, command values to respective actuators (motor/generator MG, engine Eng., first clutch CL1, second clutch, belt-type continuously variable transmission CVT) are calculated for transmit to each of the controllers 11 to 15.

Figure 2:
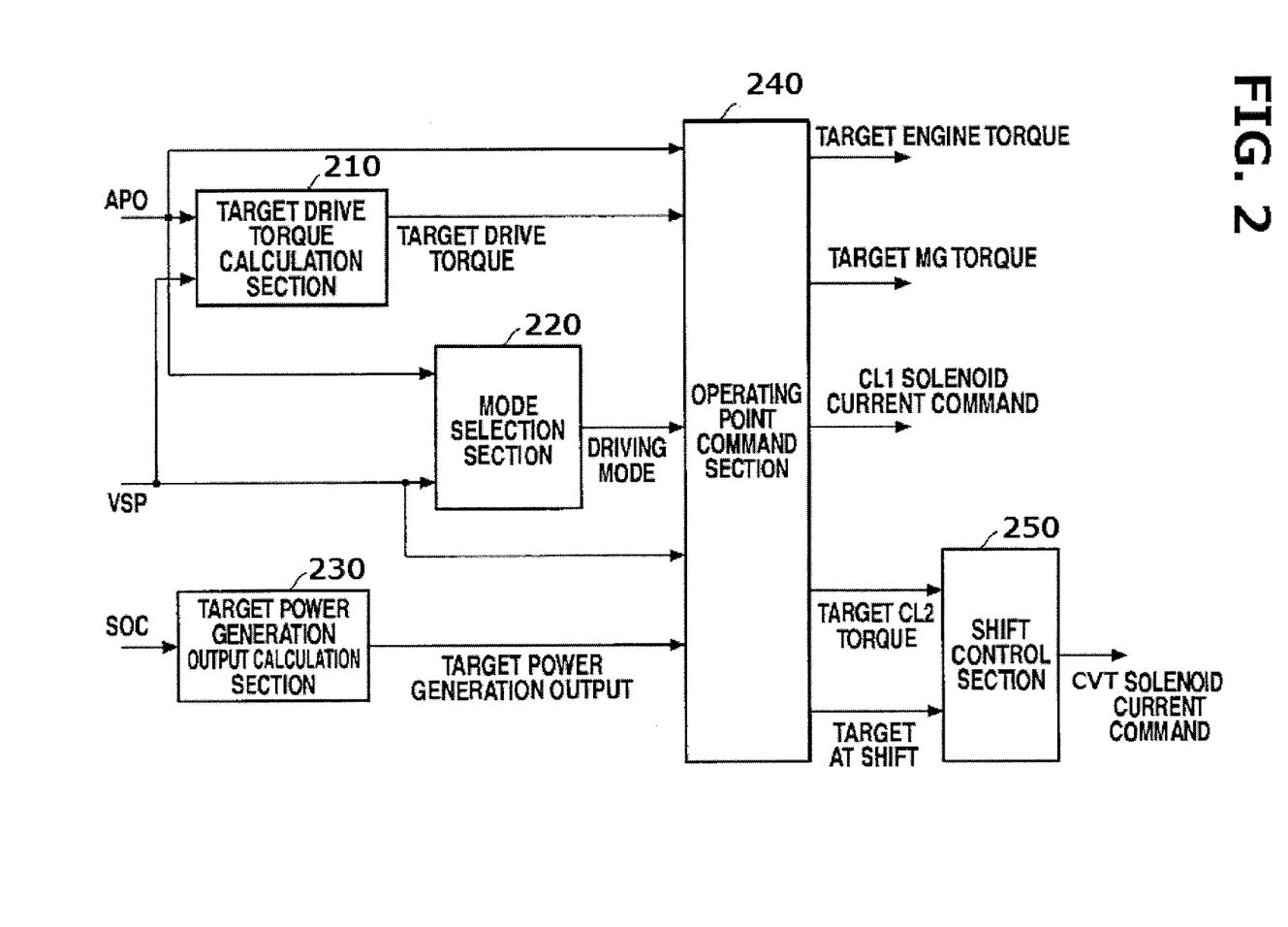
FIG. 2 is a control block diagram showing a calculation process performed by the integrated controller in the hybrid vehicle.

In other words, the integrated controller 10 is provided with, as shown in FIG. 2, a target drive torque calculation section 210, a mode selection section 220, a target power generation output calculation section 230, an operating point command section 240, a shift control section 250.

The target drive torque calculation section 210 calculates a target steady driving torque and a MG assist torque based on an accelerator pedal opening APO and a vehicle speed VSP by referring to a target steady driving torque map and a MG assist torque map.

Figure 3:
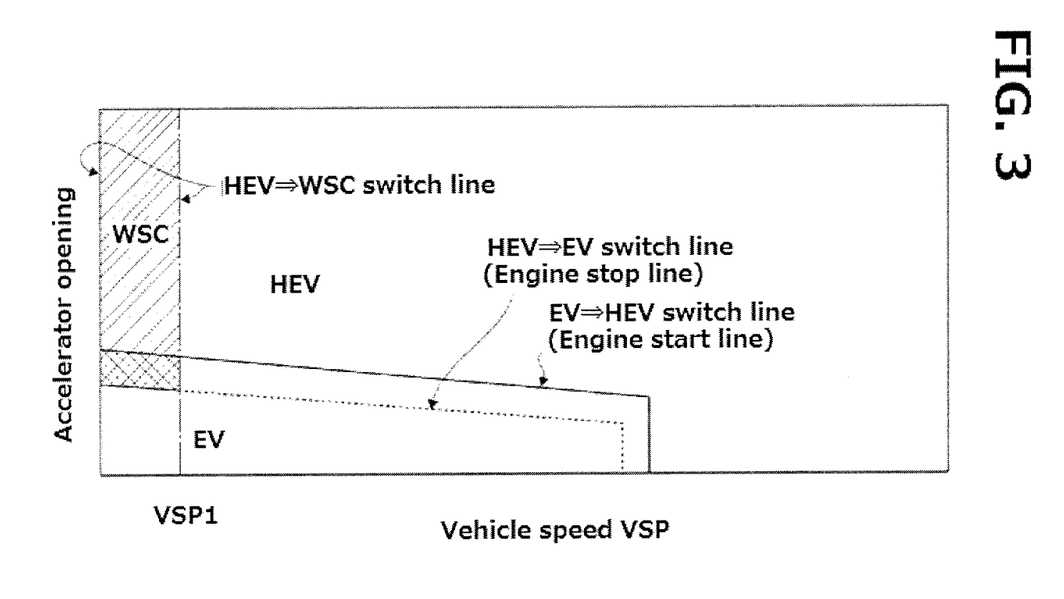
FIG. 3 is a diagram showing an example of EV-HEV selection map set in the mode selection section of the integrated controller in the hybrid vehicle.

The mode selection section 220 calculates a target drive mode (HEV mode, EV mode, WSC mode) from the accelerator opening or position APO and the vehicle speed VSP using the EV-HEV selection map shown in FIG. 3. The EV-HEV selection map sets an EV→HEV switching line (engine start line) for switching to the "HEV mode" when the operating point (APO, VSP) in the EV region crosses, an HEV→EV switching line (engine stop line) for switching to the "EV mode" when the operating point (APO, VSP) in the HEV region crosses, and an HEV→WSC switching line for switching to the "WSC mode" when the operating point (APO, VSP) enters the WSC region when the "HEV mode" is selected. The HEV→EV switching line and the HEV→EV switching line are set so as to have a hysteresis amount as lines for dividing the EV region and the HEV region from each other. The HEV→WSC switching line is set along a first set vehicle speed VSP1 at which the engine Eng. maintains idle speed when the belt-type automatic transmission CVT is in the lowest speed ratio. However, when the "EV mode" is being selected, the "HEV mode" is forced to be the target drive mode when the battery SOC (representative of battery condition and obtainable from a battery voltage and a battery temperature) has decreased to or below a prescribed value.

Thus, when the dive mode selected by the mode selection section 220 has switched from the "EV mode" to the "HEV mode", the engine ENG. is started.

The target power generation output section 230 calculates a target generation output from the battery SOC using a travelling generation required output map. The target power generation output section 230 also calculates the output that is necessary to increase the engine torque from the current engine operating point (rotation speed, torque) to the optimum fuel efficiency line. The target power generation output section 230 then compares the result of the calculated output with the target power generation output, and adds the lesser of the compared outputs to the engine output as the required output.

The operating point command section 240 calculates a transitional target engine torque, a target MG torque, a target CL2 torque capacity, a target speed ratio (target CVT shift), and a CL1 solenoid current command from the accelerator opening APO, the target steady-state torque, the MG assist torque, the target drive mode, the vehicle speed VSP, and the required generation output using these parameters as operating point targets.

The shift control section 250 calculates a CVT solenoid current command for controlling driving of the solenoid valve inside the belt-type automatic transmission CVT from the target CL2 torque capacity and the target speed ratio (target CVT shift) so that these targets are reached.

The transmission controller 11 is operable to perform a shift control to achieve a shift command from the integrated controller 10. Shift control is performed by controlling the hydraulic pressure to be supplied to the belt-type continuously variable transmission CVT through the hydraulic control circuit 100.

The clutch controller 12 receives a second clutch input rotation speed (detected by the motor rotation speed sensor 26), a second clutch output rotation speed (detected by the second clutch output rotation speed sensor 28), a clutch oil temperature (detected by a hydraulic fluid temperature sensor 29). Also, the clutch controller 12 controls a current of a solenoid valve (not shown) which is provided in the command hydraulic pressure control section 110 (see FIG. 4) to achieve the clutch hydraulic pressure (current) supplied from the hydraulic pressure control circuit 100 in response to the first clutch hydraulic pressure command value and the second clutch hydraulic pressure command value. Thus, the clutch stroke amount of the first clutch CL1 is set, and the pressing force of the second clutch CL2 is set.

The engine controller 13 receives an input of the engine rotation speed (detected by the engine rotation speed sensor 21), and performs an engine torque control t achieve the engine torque command corresponding to the target engine torque from the integrated controller 10.

The motor controller 14 controls the motor/generator MG so as to achieve the motor torque command value and the motor rotation speed command value corresponding to the target MG torque from the integrated controller 10.

The battery controller 15 manages the state of charge of the battery BAT (battery SOC), and transmits the information to the integrated controller 10. In addition, the battery SOC indicating the charge state is calculated based on a power supply voltage detected by the battery voltage sensor 15a and a battery temperature sensor 15b detected by the battery temperature sensor 15b.

(Circuit Configuration)

Figure 4:
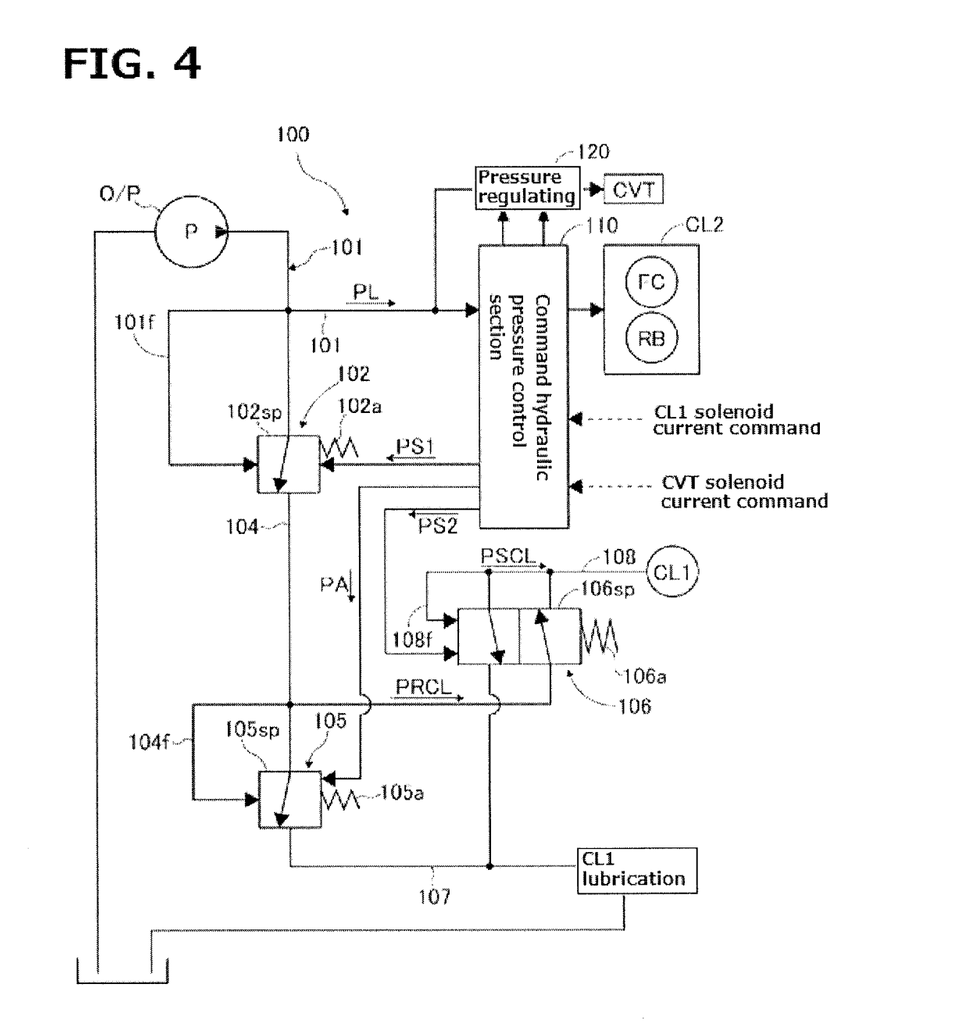
FIG. 4 is a hydraulic circuit diagram showing an essential part of a hydraulic circuit in the parallel hybrid vehicle to which the starting control apparatus for the hybrid vehicle in the first embodiment is applied.

Now, description is given of a circuit configuration of the hydraulic pressure control circuit 100 with reference to FIG. 4.

The mechanical oil pump O/P discharges or delivers operating hydraulic oil to a line pressure circuit 101. The line pressure circuit 101 in turn supplies a line pressure P1 regulated by a line pressure regulator valve 102 described below to the belt-type continuous transmission CVT, the second clutch CV2 and the command hydraulic pressure control section 110 while supplying a drain operating oil thereof toward the first clutch CL1.

Note that the command hydraulic pressure control section 110 operates solenoid valves (not shown) in response to a CVT solenoid current command and a CL1 solenoid current command from the integrated controller 10 to form a command hydraulic pressures (such as PS1, PS2, PA, described below). Also, the line pressure PL is supplied to a drive unit (not shown) of the pulley including the primary pulley PR1 (see FIG. 7) so that a hydraulic pressure prepared in a pressure regulating section 120 including valves (not shown) will be output to the belt-type continuous transmission CVT in accordance with a target CVT shift.

The line pressure circuit 101 is provided with a line pressure regulator valve 102 which regulates the line pressure PL. More specifically, the line pressure regulator valve 102 is provided with a spool 102sp to move in the axial direction, when necessary, for depressurizing the line pressure PL by allowing the line pressure circuit 101 to escape to the first clutch hydraulic circuit (vacuum side circuit) 104.

The spool 102sp, though shown schematically, receives a feedback pressure toward one of the axial direction (the right direction in the drawing) from the feedback circuit 101f. Also, the spool 102sp receives a biasing force of a spring 102a and a first control pressure PS1 which is output from the command hydraulic pressure control section 110 in the opposite direction (leftward in the drawing). The line pressure regulator valve 102 forms the line pressure PL in accordance with the resultant force of the first control pressure PS1 and the biasing force of the spring 102a, and, when the line pressure PL is excessive, causes the excessive operating oil to drain from the line pressure circuit 101 to the first clutch hydraulic circuit 104. Note that the first control pressure PS1 is intended to be formed by the command hydraulic pressure control section 110 in order to form the line pressure PL in accordance with the input torque to the belt-type continuously variable transmission CVT in response to the CVT solenoid current command output from the integrated controller 10.

The first clutch hydraulic circuit 104 is provided with a first clutch pressure regulator valve 105 and a first clutch pressure control valve 106.

The first clutch pressure regulator valve 105 is intended to regulate the hydraulic pressure of the first clutch hydraulic circuit 104 to the first clutch regulator pressure PRCL, and has a spool 105sp shown schematically in the figure.

The spool 105sp receives at one axis direction (leftward in the drawing) from the feedback circuit 104f an operating hydraulic pressure of the first clutch hydraulic pressure circuit 104 as a feedback pressure. Also, the spool 105sp receives a biasing force of the spring 105a and a control pilot pressure PA formed by the command hydraulic pressure control section 110 exerted in a direction opposite to the feedback pressure (leftward in the figure).

Thus, the first clutch pressure regulator valve 105 is to form a first clutch regulator pressure PRCL in accordance with the resultant force of the biasing force of the spring 105a and the control pilot pressure PA, and when the first clutch regulator pressure PRCL is excessive, the excess is caused to be pulled out to a drain circuit 107. Note that the operating drain oil to the drain circuit 107 is circulated for the lubrication of the first clutch CL1.

The first clutch pressure control valve 106 forms a clutch engaging pressure PCL1 to engage the first clutch CL1, and output this clutch engaging pressure PCL1 to an output circuit 103 communicative to the first clutch CL1 as the first clutch pressure control valve. More specifically, the first clutch pressure control valve 106 is provided with a spool 106sp which moves in a axial direction schematically shown in the figure.

The spool 106sp receives a biasing force of a spring 106a in one axis direction (leftward in the figure), and receives, in the opposite direction (rightward in the figure) a second control pressure PS2 output from the command hydraulic pressure control section 110 and a feedback pressure from the feedback circuit 108f.

Thus, when the clutch engaging pressure PCL1 is greater than a value corresponding to the second control pressure PS2, the first clutch pressure control valve 106 pulls the hydraulic oil in the output circuit 108 to the drain circuit 107. On the other hand, when the clutch engaging pressure PCL1 is smaller than the value corresponding to the clutch control pressure PSCL, the first clutch regulator pressure PRCL of the first clutch hydraulic circuit 104 is supplied to the output circuit 108. Note that the second control pressure PS2 is intended to refer to a hydraulic pressure that is created at the command hydraulic pressure control section 110 in accordance with the CL1 solenoid current command signal from the integrated controller 10.

(Setting of the Line Pressure PL)

Now, description is made of setting of the line pressure PL.

Figure 5:
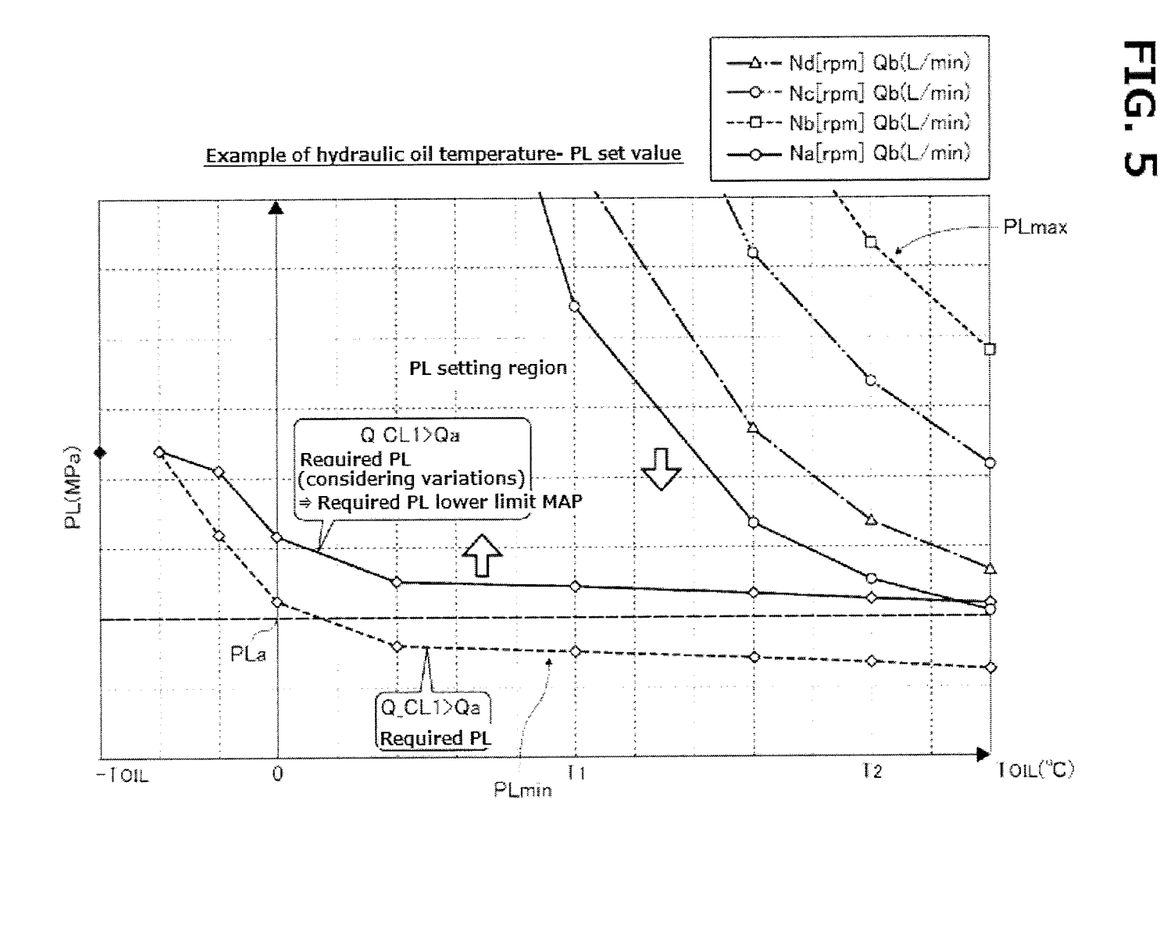
FIG. 5 is a line pressure characteristic diagram showing the characteristics of the line pressure that ensures a flow rate of the hydraulic fluid to the first clutch in the hydraulic circuit.

FIG. 5 is an explanatory diagram of a line pressure characteristic in the first embodiment.

The line pressure PL is set with a line pressure upper limit PLmax and a line pressure lower limit PLmin.

More specifically, in the first embodiment, the second clutch CL2 and the belt-type continuously variable transmission CVT are under control by the line pressure PL in line pressure circuit 101. Thus the line pressure upper limit PLmax and the line pressure lower limit PLmin are set to ensure the necessary operation in both the second clutch CL2 and the belt-type continuous transmission CVT.

Furthermore, in the first embodiment, these upper and lower limit values PLmax, PLmin are set considering to ensure a flow rate to the first clutch hydraulic circuit 104 at a predetermined amount or more. Below, the situation will be detailed.

That is, as shown in FIG. 4, in the line pressure regulator valve 102, when controlling the line pressure PL on the basis of the first control pressure PS1, the surplus of the hydraulic oil forming the line pressure PL will be pulled in the first clutch hydraulic circuit 104. Then, the clutch engaging pressure PCL1 will be formed by a first clutch regulator pressure PRCL of the first clutch hydraulic circuit 104.

Thus, in order to form the clutch engaging pressure PCL1, it is necessary to secure more than predetermined hydraulic fluid flow of Q_CL1 in the first clutch hydraulic circuit 104.

Therefore, the line pressure lower limit value PLmin and the line pressure upper limit value PLmax, are set to be realized while maintaining the predetermined hydraulic fluid flow Q_CL1 or more.

Here, an assumption is made in which the minimum required hydraulic oil flow rate Q_CL1 to form the clutch engaging pressure PCL1 is Qa (L/min). In addition, the hydraulic oil flow rate Q_CL1, which is necessary and sufficient, is Qb (L/min). Note that the relationship is established in which Qb (L/min)≥Q a (L/min).

Description is made of the line pressure upper limit PLmax.

In FIG. 5, the portion shown in the upper right indicates a map of the line pressure upper limit value PLmax.

More specifically, the solid line characteristics connecting ○ shows the line pressure upper limit PLmax with the above described operating hydraulic fluid flow rate Q_CL1 (=Qb (L/min)) secured when the motor/generator MG rotates at a rotation speed Na corresponding to an idling speed of the engine Eng.

Also, the one-dot chain line characteristics connecting Δ shows a line pressure upper limit value PLmax with the above described operating hydraulic fluid flow rate Q_CL1 (=Qb (L/min)) secured when the motor/generator MG rotates at a rotation speed Nb which is greater by 200 rpm than the above described rotation speed Na.

Further, the two-dot chain line characteristics connecting ○ shows a line pressure upper limit value PLmax with the above described operating hydraulic fluid flow rate Q_CL1 (=Qb (L/min)) secured when the motor/generator MG rotates at a rotation speed Nc which is greater by 200 rpm than the above described rotation speed Nb.

Furthermore, the dotted line characteristics connecting □ shows a line pressure upper limit value PLmax with the above described operating hydraulic fluid flow rate Q_CL1 (=Qb (L/min)) secured when the motor/generator MG rotates at a rotation speed Nd which is greater by 200 rpm than the above described rotation speed Nc.

As shown in the upper limit value map, the line pressure upper limit value PLmax is responsive to the hydraulic oil temperature TOIL, and decreases as the temperature increases.

The lower portion in FIG. 5 shows a map of the line pressure lower limit value PLmin. The line pressure lower limit value PLmin is set regardless of the rotation speed of the motor/generator MG.

In the figure, the characteristic shown by the dotted line connecting the ◇ indicates the line pressure lower limit value PLmin when the above described hydraulic fluid flow Q_CL1 equal to Qa (L/min) is secured. Then, based on this characteristic, the line pressure lower limit value PLmin characteristics is shown in a solid line connecting ◇, to which a margin in consideration of variations in the required line pressure PL is secured.

Also, in the line pressure regulator valve 102, a specific amount of stroke that can ensure hydraulic fluid flow to the first clutch hydraulic circuit 104 is present. In other words, at a position in which the spool 102sp makes a stroke in the depressurizing direction to open the first clutch hydraulic circuit 104 by a predetermined opening degree or more, the hydraulic fluid flow to the first clutch hydraulic circuit 104 may be secured.

Therefore, it is possible to determine the line pressure PL in accordance with the spool position. Also, based on this line pressure PL, an input torque TQa to the belt type continuously variable transmission CVT will be set. The line pressure PL available when controlled to this set input torque TQa represents a line pressure PLa at the time of setting the input torque.

The above described line pressure lower limit value PLmin is set somewhere on the side higher than this line pressure PLa at the time of setting the input torque.

Thus, as long as the line pressure PL is positioned somewhere between the above described line pressure upper limit value PLmax and the line pressure lower limit value PLmin, the above described hydraulic fluid flow rate Q_CL1 which is equal to Qa (L/min) or more thereof may be secured.

(Engine Starting Control)

Now, description is given of an engine starting control that is responsive to an input torque when switching from the EV running state to the HEV running state.

As described above, the engine ENG is started, with reference to the EV-HEV selection map shown in FIG. 3, under a condition in which the operation mode selected by the mode selection section 220 switches from "EV mode" to "HEV mode".

Furthermore, in the first embodiment, in parallel with this, an engine starting control takes place likewise in response to a transmission input torque TQCVT representing the input torque to the belt-type continuously variable transmission CVT. When a determination is made responsive to either of these conditions, the engine start will be performed.

Figure 6:
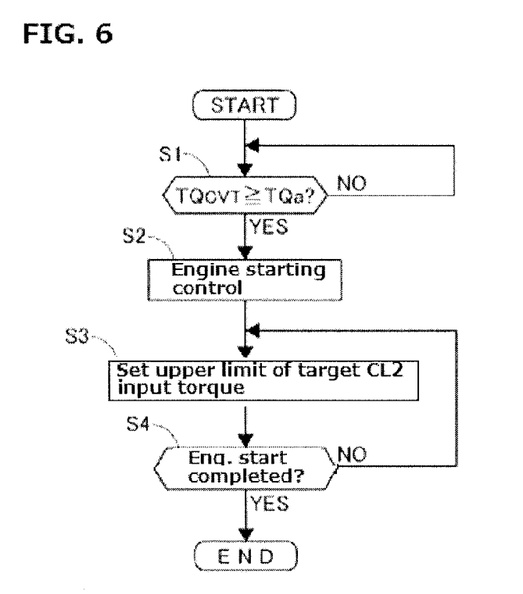
FIG. 6 is a flowchart showing a flow of processing at the start of the engine in the starting control apparatus for a hybrid vehicle in the first embodiment.

Below, with reference to a flowchart shown in FIG. 6, description is given of an engine starting control according to the transmission input torque TQCVT.

In step S1, the transmission input torque TQCVT is calculated, and it is determined whether or not the transmission input torque TQCVT exceeds a set input torque TQa. When not exceeded, determination is made for non-start, and the determination is repeated in step S1. On the other hand, when the transmission input torque TQCVT exceeds the set input torque TQa, control initiates the engine starting control in step S2.

Here, description is give on the transmission input torque TQCVT.

Figure 7:
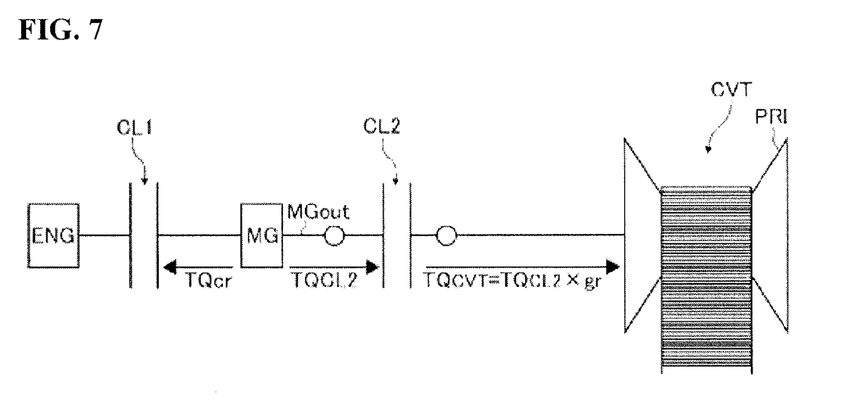
FIG. 7 is a structural schematic view of the torque transmission path from the engine to the belt-type continuously variable transmission as enlarged schematically from the engine.

FIG. 7 is an enlarged view schematically showing a torque transmission path from the engine Eng. to belt-type continuously variable transmission CVT.

More specifically, a first clutch CL1 is disposed between the engine Eng. and the motor/generator MG, while a second clutch CL2 is disposed between the motor/generator MG and belt-type continuously variable transmission CVT. Here, the output torque of the motor/generator MG is partly used for a cranking torque at the time of engine start, and the rest thereof will input to the primary pulley PR1 of the belt-type continuous variable transmission CVT as a target CL2 torque TQCL2 to serve as a vehicle driving torque via the second clutch CL2, at the time of starting the engine.

The second clutch CL2 is provided with a planetary gear PG, and a torque is transmitted in a predetermined gear or speed ratio during forward and backward travel of the vehicle. Thus, in step S1, the transmission input torque TQCVT is calculated by multiplying the target CL2 torque TQCL2 and the speed ratio gr of the second clutch CL2 at that time. Here, when the forward speed ratio is assumed to be grf and the gear speed during rearward movement grr, respectively, the transmission input torque TQCVT may be respectively obtained by the following formula (1), and (2).

$$\text{(Forward-movement) } TQCVT = TQCL2 \times grf \tag{1}$$

$$\text{(Backward-movement) } TQCVT = TQCL2 \times grr \tag{2}$$

In the engine starting control in step S2, as is well known, while allowing the second clutch CL2 to slip, the output of the motor/generator MG is increased by adding a fraction required for the cranking torque (TQcr), and the first clutch is controlled in the engaging direction of the first clutch CL1 which is in the slip state.

In step S3, following the process in step S2, the upper limit of the target CL2 torque TQCL2 is set to a value obtained by dividing the set input torque TQa by a gear or speed ratio Gr (i.e. grf or grr), and control proceeds to step S4.

In step S4, a determination is made whether or not the engine Eng. has become complete combustion state, Once the complete combustion state has been confirmed, process ends and starting process is concluded. When the complete combustion is not achieved, control repeats the determination in step S3.

Note that the complete combustion of the engine is confirmed when the engine rotation speed EN (rpm) continuously exceeds a preset threshold indicative of the complete combustion state of the engine Eng.

(Operation of the First Embodiment)

Now, the operation of the first embodiment will be described with reference to the time chart in FIG. 8.

<Comparative Example>

Here, for comparison with the first embodiment, an operation example in the conventional technique to which the present invention is not applied.

Figure 8:
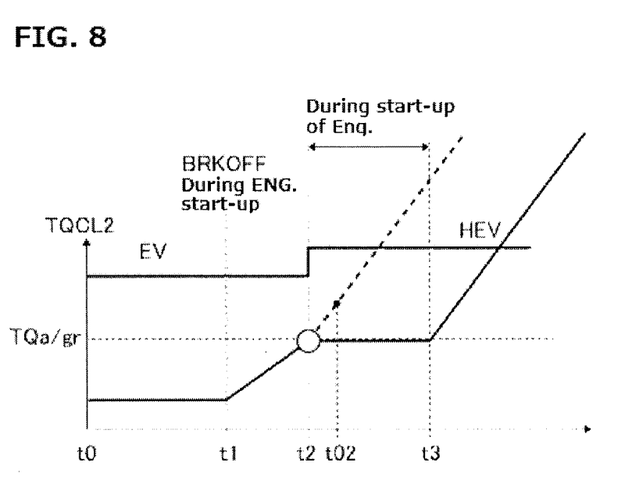
FIG. 8 is a time chart for describing the operation at the time of the starting control of the hybrid vehicle according to the first embodiment compared to the operation in Comparative Example.

In FIG. 8, at the time of t0, the engine Eng. is stopping in an idling stop state, and the running or driving mode is controlled in the EV mode. Then, at the time of t1, the driver starts out the vehicle with a driver requested torque being increased.

In response to increase of the driver requested torque, in FIG. 8, a determination is made for engine start at the time of t02. Note that this start determination is made based on the accelerator pedal opening APO and the vehicle speed VSP with reference to the EV-HEV selection map shown in FIG. 3.

Once the engine start determination is made at the time of t02, in order to transition from the EV mode to the HEV mode, the target MG torque command value is outputted from the operating point command unit or section 240 to the motor/generator MG, and the target MG torque is increased by adding a cranking torque TQcr. At the same time, while maintaining the second clutch CL2 in a slip state to thereby prevent the torque fluctuation of the motor/generator MG from being transmitted to the driving wheels, the first clutch CL1 is allowed to change gradually from the disengaged state to the engaged state by slipping the second clutch CL2 and the engine rotation speed EN is allowed to increase.

In the time chart, the engine is being started during a period between the time of t02 and the time t3, at the time of t3, the state in which the engine rotation speed EN continuously exceeds the complete combustion threshold for a preset time to thereby conclude the start of the engine Eng.

After the engine has been started, both the first and second clutches CL1, CL2 are connected so that the resultant force of the output torque of the engine Eng. and the motor/generator MG is input to the belt type continuously variable transmission CVT.

Here, in the Comparative Example, the target CL2 torque TQCL2 is made, as shown by dotted line in FIG. 8, responsive to the driver requested torque and is controlled so as to increase with time.

In this case, the transmission input torque TQCVT in the belt type continuously variable transmission CVT corresponds to a value obtained by multiplying the speed ratio gr to the target CL2 torque TQCL2. Thus, in response to the driver requested torque, when a request for a high torque input to the belt type continuously variable transmission CVT is made, it is necessary to set the line pressure PL at high value, accordingly.

When increasing the line pressure PL, in the hydraulic control circuit 100, the hydraulic fluid flow Q_CL1 removed from the line pressure regulator valve 102 to the first clutch hydraulic circuit 104 decreases, a possibility arises in which the engaging pressure of the first clutch CL1 is not secured on a stable basis.

That is, when the flow rate of the first clutch hydraulic circuit 104 is squeezed, in the spool 105sp of the first clutch pressure regulator valve 105, while the control pilot pressure PA received on one side remains unchanged, the feedback pressure from feedback circuit 104f decreases. Thus, the first clutch pressure regulator valve 105 will operate to sharply increase or surge in pressure of the first clutch hydraulic circuit 104. The rapid increase in the first clutch hydraulic circuit 104 is transmitted through a first clutch pressure control valve 106 which is in operation for gradually increasing the engaging pressure to the output circuit 108, which will cause the surge pressure in the engaging pressure. In addition, in the first clutch pressure control valve 106, due to the feedback operation that corresponds to the rapid increase in the above described engaging pressure, another operation to decrease the engaging pressure on a rapid basis. Thus, the output circuit 108 experiences rapid fluctuations in pressure (pressure surge).

Then, during engine start-up, when such surge pressure is generated, the first clutch CL1 shows a temporarily rapid engaging and releasing behavior. Therefore, a phenomenon occurs that the motor speed is temporarily retracted and the engine starting performance is deteriorated, leading to change in vehicle speed, and generation of noise and vibration in the vehicle.

<Operation of the First Embodiment>

In contrast to the operation of the Comparative Example, in the first embodiment, it is possible to suppress deterioration in the engine start performance and generation of sound and vibration. Description is now made with reference to the time chart in FIG. 8.

In the first embodiment, a determination of engine start is made at time when the transmission input torque TQCVT exceeds a set input torque TQa. The time at which the transmission input torque TQCVT exceeds the set input torque TQa is defined as the time at which the target CL2 torque TQCL2 exceeds a value obtained by dividing the set input torque TQa by the speed ratio gr, and is represented as the time point shown in the figure as t2.

Thus, the engine Eng. is started at the time of t2.

In the example shown in FIG. 8, the start time (t2) of the engine Eng. is set at a slightly earlier timing than the start time (t02) in the start time I the Comparative Example. More specifically, when starting the engine Eng. at the time of T02, the transmission input torque TQCVT will be relatively higher. As a result, the line pressure PL is controlled to a relatively high pressure. Thus, as described above, due to generation of surge pressure, there is a risk of deterioration in engine start property as well as generation of sound and vibration.

In contrast, in the first embodiment, the time point for starting the engine Eng. is advanced and set earlier than the time in which the transmission input torque TQCVT increases, it is possible to suppress the occurrence of the surge pressure due to the increase in the line pressure PL.

Also, after the beginning of startup of the engine Eng, during a time period between the time of t2 and t3 during engine start-up, in the first embodiment, based on the process in step S3, the upper limit of the target CL2 torque TQCL2 is set to a value obtained by dividing the set input torque TQa by the speed ratio gr (i.e., grf or grr).

Thus, the target CL2 torque TQCL2 will shift, as shown in FIG. 8, during a time period between t2 and t3, while remaining to be controlled to the set input torque TQa. Thus, the first clutch hydraulic circuit 104 is ensured with a hydraulic fluid flow Q_CL1, which may control the first clutch CL1 stably with a hydraulic fluid flow Q_CL1 which is greater than Qa.

Therefore, during the engine start, since the occurrence of the above described surge pressure can be prevented or suppressed, it is possible to prevent or suppress the first clutch CL1 from being temporarily and rapidly engaged or released. Further, it is possible to prevent or inhibit transient retracted or reduction phenomenon in the motor speed MN, so that it is possible to prevent or inhibit worsening of engine starting property, the generation of noise and vibration due to a change in vehicle speed.

(Effect of the First Embodiment)

The starting control apparatus for a hybrid vehicle in the first embodiment described above achieves the effects listed below.

1) The starting control apparatus for a hybrid vehicle in the first embodiment is provided with:
 a first clutch disposed in a drive transmission system for transmitting the driving force of an engine Eng. to left and right drive wheels LT, RT, the first clutch being operable to selectively connect and disconnect the transmission between the engine side and the drive wheel side;
 a motor/generator MG disposed in the drive transmission system on the side of the drive wheels with respect to the first clutch CL1 for selectively outputting a driving force to the drive transmission system, the motor/generator being configured to output a driving force in the engaged state of the first clutch CL1 to thereby start the engine;
 a belt-type continuously variable transmission CVT as an automatic transmission interposed between the motor/generator MG and the left and right drive wheels LT, RT;
 a mechanical oil pump O/P that is driven by the motor/generator MG to deliver operating hydraulic fluid to the belt-type continuously variable transmission CVT via a line pressure circuit 101;
 a line pressure regulator valve 102 disposed in the line pressure circuit 101 and acting as a control valve to increase the operating hydraulic pressure of the line pressure circuit 101 in accordance with increase in an input torque to the belt-type continuously variable transmission CVT;
 an integrated controller 10 that is configured acting as a starting control section to perform an engine starting control for starting the engine Eng. by inputting a torque with the first clutch CL1 engaged in response to an engine start request in an EV running or driving mode by the driving force of the motor/generator with a second clutch CL2 engaged; and
 a start determining section (to perform the process in step S1) that is contained in the integrated controller 10, the start determining section being configured to calculate a transmission input torque TQCVT indicative of the input torque to the belt-type continuously variable transmission CVT and to perform the engine starting control when the transmission input torque TQCVT exceeds a set input torque TQa predetermined based on the line pressure PL representing the operating hydraulic pressure.

Therefore, in the first embodiment, when the transmission input torque TQCVT (=TQCL2×gr) exceeds the set input torque TQa, the engine starting control will be executed.

Therefore, it is possible to suppress the transmission input torque TQCVT (=TQCL2×gr) during the engine starting control. Also, it is possible to suppress the hydraulic fluid pressure in the line pressure circuit 101.

Thus, the transmission torque of the first clutch CL1 is suppressed from becoming unstable due to shortage in engaging pressure of the first clutch CL1 accompanied by increase in hydraulic fluid pressure so that deterioration in the engine startability and generation of noise and vibration may be suppressed.

2) The starting control apparatus for a hybrid vehicle in the first embodiment is characterized by setting the input torque TQa based on the available line pressure range (PL setting range in FIG. 5) which is capable of supplying the operating hydraulic fluid or oil to the first clutch CL1 stably during the engine starting process.

Thus, the line pressure PL rises with an increase in transmission input torque TQCVT (=TQCL2×gr) so that it is possible to suppress or prevent a shortage of the hydraulic fluid to the clutch CL1, which in turn makes it reliable to achieve the effect described in 1) above.

3) In the starting control apparatus for a hybrid vehicle in the first embodiment, the second clutch CL2 is interposed between the motor/generator MG and the belt-type continuously variable transmission CVT, and the integrated controller 10 acting as the starting control section is provided with an upper limit setting section (section for executing the process of S3) that is configured to set the upper limit value of the input torque to the second clutch CL2 during the starting control such that the transmission input torque TQCVT (=TQCL2×gr) is equal to the set input torque TQa or less. Therefore, after starting the engine starting control, even during the engine starting control, the transmission input torque TQCVT (=TQCL2×gr) can be set so as not to exceed the set input torque TQa.

Thus, by setting the upper limit value of the input torque of the second clutch CL2 during the start-up control, the transmission input torque TQCVT (=TQCL2×gr) may be set to the set input torque TQa or less. Thus, over the entire period during the starting control of the engine Eng., it is possible to suppress the transmission input torque TQCVT (=TQCL2×gr) so as to reliably achieve the effects of 1) and 2) described above.

4) The starting control apparatus for a hybrid vehicle is the first embodiment is characterized by providing a second clutch torque control section (section that executes the process of S3) that is configured to control such that the input torque to the second clutch CL2 will not exceed an upper limit value set by the upper limit setting section. Thus, in the first embodiment, while performing the starting control, the input torque to the second clutch CL2 (a target CL2 torque TQCL2) is controlled so as not to exceed the upper limit value. Thus, over the entire period of start-up control of the engine Eng, the control of the transmission input torque TQCVT (=TQCL2×gr) to hold to the set input torque TQa or below can be reliably achieved, and the effects described in 1) to 3) above can be obtained reliably.

Note that the second clutch CL2 is controlled to be in a slip state during engine starting control, so that rapid increase in the target CL2 torque TQCL2 will not be expected. Therefore, during engine starting control, without requiring to the belt-type continuously variable the input torque larger than the target CL2 torque TQCL2, no problem would occur with respect to the belt transmission capacity. Therefore, as described above, by setting the upper limit to the transmission input torque TQCVT (=TQCL2×gr), it is possible to stabilize the engaging pressure of the first clutch CL1.

5) The starting control apparatus for a hybrid vehicle in the first embodiment is further provided with a transmission input torque calculating section (section to perform the process in S1) that is configured to calculate the transmission input torque TQCVT based on a command value for a target CL2 torque requesting for a transmission torque in the second clutch CL2 and a speed ratio (gear ratio gr) of the belt-type continuously variable transmission CVT.

Thus, the transmission input torque TQCVT may be readily calculated since calculation is made based on the conventionally used, existing target second clutch torque command value and a speed ratio (gear ratio gr) of the previously available belt-type continuously variable transmission CVT.

6) In the starting control apparatus for a hybrid vehicle in the first embodiment, the line pressure regulator valve 102 acting as the control valve is configured in a valve that pulls the operating oil from the line pressure circuit 101 into the first clutch hydraulic circuit that supplies the operating oil to the first clutch CL1 when the line pressure PL exceeds the control pressure.

In such a structure, in response to increase in the input torque of the belt-type continuously variable transmission CVT, when increasing the line pressure PL, the hydraulic oil amount to be pulled to the first clutch hydraulic circuit 104 is reduced, so that the hydraulic pressure supplied from the first clutch hydraulic circuit 104 to the first clutch CL1 becomes unstable.

In the first embodiment, as described in 1) and 2) above, by executing the starting control when the transmission input torque TQCVT exceeds a preset set input torque TQa, it is possible to stabilize the supply pressure to the first clutch CL1. Thus, the phenomenon in which the hydraulic pressure supplied to the first clutch CL1 is unstable is prevented from occurring, and deterioration in engine starting property, shock of the vehicle, and generation of sound and vibration may be suppressed.

7) The starting control apparatus for a hybrid vehicle in the first embodiment is further provided with a first clutch pressure regulator valve 105 for regulating the pressure of the first clutch hydraulic pressure circuit 104 and a first clutch pressure control valve 105 for controlling the engaging pressure by selectively supplying to or discharging from the first clutch CL1 with respect to the first clutch hydraulic pressure circuit.

The first clutch pressure regulator valve 105 is provided with a spool that regulates a pressure by a axial movement, the spool 105sp receiving a feedback pressure of the first clutch hydraulic circuit 104 in the direction of depressurizing the first clutch hydraulic circuit 104 while receiving a control pilot pressure PA that is formed by an initial urging force and a pressure control section (command hydraulic pressure control section 110) in the pressure increasing direction of the first clutch hydraulic circuit 104.

In such a structure, when increasing the pressure in the line pressure circuit 101, the hydraulic fluid amount of the first clutch hydraulic circuit 104 decreases so that the feedback pressure exerted on the spool 105sp of the first clutch pressure regulator valve 105 may decrease. To cope with this situation, the spool 105sp is allowed to move in the pressure increasing direction and to operate to increase the flow rate on the side of the first clutch hydraulic circuit 104. Thus, excessive hydraulic fluid flow is generated on the side of the first clutch pressure control valve 106, which may lead to the situation in which the engaging pressure fluctuates (surge pressure) in the output circuit 108 of the first clutch CL1.

In this structure, as described in 1) and 2), by performing the engine starting control when a preset input torque TQa is exceeded to thereby prevent the fluctuations in the engaging pressure of the first clutch CL1 due to occurrence of the above-described surge pressure, deterioration in engine starting performance, shock generation of the vehicle, and generation of noise and vibration may be suppressed.

Although description is given of the vehicle control apparatus according to the present invention based on the first embodiment, specific configurations are not limited to the embodiment, and without departing from the gist of the inventions pertaining to each claim in CLAIMS below, changes in design and additions are acceptable.

For example, in the first embodiment, an example of application to the FF hybrid vehicle is shown. However, without limiting to this, the present invention may be applicable to FR hybrid vehicle or a parallel hybrid vehicle.

Also, in the first embodiment, the belt-type continuously variable transmission is disposed between the second clutch and the left and right drive wheels. However, the transmission may be a stepped automatic transmission.

In the first embodiment, an example is shown in which the mechanical oil pump is provided in the second clutch. The mechanical pump may be disposed somewhere on the side of the drive wheels relative to the first clutch so as to be arranged within the transmission or in another location.

In the first embodiment, the operating hydraulic fluid is oil. However, as long as the fluid is capable of transmitting pressure, the operating fluid is not limited to oil.

Also, in the embodiment, an example is illustrated in which a second clutch is disposed between the motor and the automatic transmission. However, the present invention may be applied to the configuration in which the motor and the transmission are directly coupled each other.

In the first embodiment, an example is shown in which torque control is executed on the second clutch in order for the transmission input torque not to exceed the preset torque after the transmission input torque has exceeded a set torque and the starting control has been initiated. However, the present invention is not limited thereto. For example, the invention may be configured such that, when the transmission input torque exceeds the set torque to thereby initial the starting control, the target CL2 torque may be controlled to increase in gradual slope than the slope corresponding to the driver requested torque.

CROSS-REFERENCE TO RELATED APPLICATIONS

The present application claims priority based on Japanese Patent Application No. 2012-221966, filed in Japan Patent Office on Oct. 4, 2012, and the disclosure of which is incorporated herein by reference in its entirety.

The invention claimed is:

1. A starting control apparatus for a hybrid vehicle, comprising:
a first clutch disposed in a drive transmission system for transmitting a driving force of an engine to a drive wheel, the first clutch being configured to selectively connect and disconnect the transmission between the engine side and the drive wheel side;

a motor disposed in the drive transmission system on the side of the drive wheel with respect to the first clutch for selectively outputting the driving force to the drive transmission system, the motor being configured to output the driving force in the engaged state of the first clutch to thereby start the engine;

an automatic transmission interposed between the motor and the drive wheel;

a mechanical pump that is driven by the motor to deliver operating hydraulic fluid to the automatic transmission via a line pressure circuit;

a control valve disposed in the line pressure circuit to increase the operating hydraulic pressure of the line pressure circuit in accordance with increase in an input torque to the automatic transmission;

a starting control section that is configured to perform an engine starting control for starting the engine by inputting a torque from the motor with the first clutch engaged in response to an engine start request by the driving force of the motor in an EV driving mode; and a start determining section that is contained in the starting control section, the start determining section being configured to calculate the transmission input torque representing the input torque to the automatic transmission and to perform the engine starting control when the transmission input torque exceeds a preset input torque determined based on the operating hydraulic pressure.

2. The starting control apparatus for a hybrid vehicle as claimed in claim 1, wherein the preset input torque used in the start determining section is set based on the available line pressure range which is capable of supplying the operating hydraulic fluid to the first clutch stably during the engine start-up process.

3. The starting control apparatus for a hybrid vehicle as claimed in claim 1, wherein a second clutch is interposed between the motor and the automatic transmission, and the starting control section is provided with an upper limit setting section that is configured to set the upper limit value of the input torque to the second clutch during the starting control such that the transmission input torque is equal to the preset input torque or less.

4. The starting control apparatus for a hybrid vehicle as claimed in claim 3, wherein the starting control section further comprises:

a second clutch torque control section that is configured to control such that the input torque to the second clutch will not exceed an upper limit value set by the upper limit setting section.

5. The starting control apparatus for a hybrid vehicle as claimed in claim 3, wherein the start determining section further comprises:

a transmission input torque calculation section that is configured to calculate the transmission input torque based on a target second clutch command value requesting a transmission torque to the second clutch and the speed ratio of the automatic transmission.

6. The starting control apparatus for a hybrid vehicle as claimed in claim 1, wherein the control valve is configured as a valve that pulls the operating fluid from the line pressure circuit into the first clutch hydraulic circuit that supplies the operating fluid to the first clutch when the line pressure exceeds the control pressure.

7. The starting control apparatus for a hybrid vehicle as claimed in claim 6, wherein the first clutch hydraulic pressure circuit further comprises:

a first clutch pressure regulator valve that regulates a pressure of the first clutch hydraulic pressure circuit, and a first clutch pressure control valve that controls the engaging pressure by selectively supplying to or discharging from the first clutch with respect to the first clutch hydraulic pressure circuit, wherein the first clutch pressure regulator valve includes a spool that regulates a pressure by a axial movement, the spool being configured to receive a feedback pressure of the first clutch hydraulic circuit in the direction of depressurizing the first clutch hydraulic circuit while receiving a control pilot pressure that is formed by an initial urging force and a pressure control section in the pressure increasing direction of the first clutch hydraulic pressure circuit.

* * * * *